United States Patent [19]

Upchurch et al.

[11] Patent Number: 4,855,274

[45] Date of Patent: Aug. 8, 1989

[54] PROCESS FOR MAKING A NOBLE METAL ON TIN OXIDE CATALYST

[75] Inventors: Billy T. Upchurch, Virginia Beach; Patricia A. Davis; Irvin M. Miller, both of Newport News, all of Va.

[73] Assignee: The United States of America as represented by the Administrator of the National Aeronautics and Space Administration, Washington, D.C.

[21] Appl. No.: 90,874

[22] Filed: Aug. 31, 1987

[51] Int. Cl.$^4$ .............................................. B01J 23/62
[52] U.S. Cl. .................................. 502/339; 502/325; 502/344
[58] Field of Search ............... 502/242, 249, 325, 339, 502/344

[56] References Cited

U.S. PATENT DOCUMENTS

| | | | |
|---|---|---|---|
| 2,079,404 | 5/1937 | Harris | 502/261 X |
| 2,123,732 | 7/1938 | Keitel et al. | 502/261 |
| 2,742,437 | 4/1956 | Houdry | 502/261 X |
| 2,742,437 | 4/1956 | Houdry | 502/261 |
| 2,840,528 | 6/1958 | Mills et al. | 502/239 |
| 2,930,765 | 3/1960 | Cooper et al. | 502/261 X |
| 3,149,914 | 9/1964 | Bellringer et al. | 502/242 X |
| 3,161,605 | 12/1964 | Beck et al. | 252/455 |
| 3,513,109 | 5/1970 | Stiles | 502/261 X |
| 3,535,270 | 10/1970 | Mulaskey | 502/239 |
| 3,668,148 | 6/1972 | Van Beek et al. | 502/261 X |
| 4,524,051 | 6/1985 | Wright et al. | 423/247 |
| 4,590,177 | 5/1986 | Richard et al. | 502/261 X |

FOREIGN PATENT DOCUMENTS 0107471 10/1983 European Pat. Off. .
107471 5/1984 European Pat. Off. .

OTHER PUBLICATIONS

Above References A, C and L were Cited by Applicants.

Primary Examiner—W. J. Shine
Attorney, Agent, or Firm—George F. Helfrich; Charles E. B. Glenn; John R. Manning

[57] ABSTRACT

A quantity of reagent grade tin metal or compound, chloride-free, and high-surface-area silica spheres are placed in deionized water, followed by deaerating the mixture by boiling and adding an oxidizing agent, such as nitric acid. The nitric acid oxidizes the tin to metastannic acid which coats the spheres because the acid is adsorbed on the substrate. The metastannic acid becomes tin-oxide upon drying and calcining. The tin-oxide coated silica spheres are then placed in water and boiled. A chloride-free precious metal compound in aqueous solution is than added to the mixture containing the spheres, and the precious metal compound is reduced to a precious metal by use of a suitable reducing agent such as formic acid. Very beneficial results have been obtained using the precious metal compound tetraammine platinum(II) hydroxide.

7 Claims, No Drawings

4,855,274

PROCESS FOR MAKING A NOBLE METAL ON TIN OXIDE CATALYST

ORIGIN OF THE INVENTION

The invention described herein was made jointly in the performance of work under NASA Contract No. NAS1-18252 and employees of the United States Government. In accordance with 35 USC 202, the contractor has elected not to retain title.

BACKGROUND OF THE INVENTION

This invention relates to a method of producing a noble metal catalyst, and more particularly, to a method of producing a metal on metal oxide catalyst for use in a carbon dioxide laser.

In a closed cycle carbon dioxide laser, a high voltage discharge is used to initiate laser emission. However, this electrical discharge also causes some of the carbon dioxide in the laser to partially dissociate into carbon monoxide and oxygen in the high voltage discharge region. The continual dissociation of carbon monoxide during laser operation causes the concentration of carbon dioxide to decrease and that of carbon monoxide and oxygen to increase. The loss of carbon dioxide coupled with the gain in oxygen causes a rapid loss in laser power. To maintain laser power, it is necessary to recombine the carbon monoxide and oxygen products.

While different catalysts have been used to effect the recombination of carbon monoxide and oxygen, the $CO_2$ laser demands a catalyst which is very efficient at room temperature. It has been found that noble metal on tin(IV) oxide catalysts supported on an inert substrate are effective under such conditions. There are several known methods of making such catalysts. However, all of these processes include either time consuming extra drying and calcining steps or the use of chloride-containing materials. The use of chloride containing compounds necessitates thorough washing of the catalyst, because chloride is known to poison and deactivate the catalyst. Consequently, a need continues to exist for a simple, chloride-free method of producing a noble metal on metal oxide catalyst for use in a closed-cycle $CO_2$ laser.

Accordingly, it is an object of this invention to provide a simple method of producing a noble metal on metal oxide catalyst on an inert, high-surface area substrate using chloride-free reagents for use in a $CO_2$ laser.

A further object of this invention is to provide a one-step method of adding a layer of a metal oxide to an inert support material.

A further object of this invention is to provide a one-step method of adding a layer of a noble metal to metal oxide on an inert support.

A further object of this invention is to provide a method of producing a noble metal on metal oxide catalyst wherein the reagents used and products formed during the reaction are either volatile or decompose to volatile products during drying.

Other objects and advantages of this invention will become apparent hereinafter in the specification which follows.

SUMMARY OF THE INVENTION

According to the present invention, the foregoing and additional objects are attained by placing a quantity of reagent grade tin metal or compound, chloride-free, and high-surface-area silica spheres in deionized water, deaerating the mixture by boiling, and adding an oxidizing agent, such as nitric acid. The nitric acid oxidizes the tin to metastannic acid which coats the spheres because the metastannic acid will be adsorbed on the substrate. The metastannic acid will become tin-oxide upon drying and calcining. The tin-oxide coated silica spheres are then placed in water and boiled. A chloride-free precious metal compound in aqueous solution is then added to the mixture containing the spheres, and the precious metal compound is reduced to a precious metal by use of a suitable reducing agent such as formic acid. Very beneficial results have been obtained using the precious metal compound tetraammineplatinum (II) hydroxide.

DETAILED DESCRIPTION OF THE INVENTION

The present invention comprehends producing a noble metal on metal oxide catalyst on an inert, high-surface-area support material which will function as a catalyst at approximately room temperature using chloride-free reagents. This is accomplished in a two-step process. In the first step, a commercially available, inert, high surface area support material, such as high surface area silica spheres, is coated with a thin layer of metal oxide, a monolayer equivalent. In the second step, the coated support is then coated with a thin layer of a precious metal amounting to a fraction of a monolayer equivalent. The purpose of these thin layers is to maintain the high surface area of the catalyst by not blocking the pores in the support.

The first step is accomplished by first preparing a mixture of a commercially available, inert, high-surface-area support material, such as high-surface area silica spheres, and an oxidizing agent. Very beneficial results have been obtained using nitric acid as an oxidizing agent since it leaves no residue. It is also helpful if the spheres are first deaerated by boiling in water to allow the entire surface to be coated. A metal, such as tin, is then dissolved in the oxidizing agent/support material mixture to yield, in the case of tin, metastannic acid. Although tin has proven especially beneficial for use in a closed-cycle $CO_2$ laser, in general any metal with two valence states, such as most transition metals and antimony, may be used. The metastannic acid will be adsorbed onto the high-surface-area spheres and coat the spheres. Any excess oxidizing agent is then evaporated and the resulting metastannic acid-coated spheres are dried and calcined, whereby the metastannic acid becomes tin(IV) oxide.

The second step is accomplished by preparing an aqueous mixture of the tin(IV) oxide coated spheres and a soluble, chloride-free salt of at least one catalyst metal. The catalyst metal may be selected from the group consisting of platinum, palladium, ruthenium, gold and rhodium or other platinum group metals. Extremely beneficial results have been obtained using chloride-free salts of platinum, palladium, or a combination thereof, such as tetraammine platinum(II) hydroxide $(Pt(NH_3)_4(OH)_2)$ or tetraammine palladium nitrate $(Pd(NH_3)_4(NO_3)_2)$. It is also beneficial if the coated spheres are first deaerated by boiling. The platinum salt will be adsorbed onto the high surface area and coat the spheres. A chloride-free reducing agent is then added to the aqueous mixture whereby the catalyst metal is deposited on the tin(IV) oxide coated spheres. Any reducing agent which decomposes to volatile products and water upon reaction or drying may be used. Formic acid, hydroxylamine ($NH_2OH$), hydrazine ($N_2H_4$), and ascorbic acid are particularly advantageous. After the metal has been deposited on the tin(IV) oxide coated spheres the solution is evaporated to dryness, whereby the desired noble metal on metal oxide catalyst is obtained.

The present invention is particularly advantageous because the method of forming and applying tin oxide to a substrate is a one-step process that results in a more uniform application than other methods. Similarly, the method of forming and applying a precious metal to either tin oxide or an inert substrate is a one-step process and occurs at a lower temperature than that commonly used by other processes. Most importantly, the present invention is inherently clean because excess reagents, such as nitric acid and formic acid, as well as unwanted products, such as nitrates and formates, all decompose and are removed from the system by simple evaporation without the necessity to separate them by filtration or washing. Furthermore, as it is possible to apply extremely thin layers of the tin oxide and precious metals, the present invention is able to coat high-surface area substrates without appreciably blocking small pores, which greatly increases the efficiency of the catalyst. For example, prior methods have yielded a catalyst with a B.E.T. surface area between approximately 65 $m^2/g$ and 70 $m^2/g$. By contrast, the present invention has yielded the same catalyst with an increased B.E.T. surface of approximately 170 $m^2/g$.

It should become obvious to those skilled in the art that this invention is not limited to the examples herein described.

EXAMPLE

Ten grams of commercially available, high surface area silica spheres, 10 microns in diameter, having a B.E.T. surface area of 167 $m^2/g$, were placed in deionized water. Two grams of reagent grade tin powder were added. This was an amount sufficient to coat the spheres with one monolayer equivalent of tin(IV) oxide. The water was boiled for 3 minutes to deaerate the solids. After cooling the liquid, nitric acid was added to obtain a 2.25 molar concentration. The mixture was then slowly stirred and heated to 50° C. A white suspension settled out and the temperature was raised to 110° C. for overnight evaporation and drying. Twenty two grams of deionized water were added to the dried powder, and boiled again for 3 minutes to deaerate it. Then, 3.5 grams of $Pt(NH_3)_4(OH)_2$ (sufficient for $\frac{1}{3}$ monolayer equivalent of Pt on the surface of the spheres) was dissolved in 78 grams of hot deionized water. This solution was added to the hot water containing the spheres and stirred slowly. To reduce the $Pt(NH_3)_4(OH)_2$ to platinum metal, 6 equivalents of formic acid (3 g of 88%) were added and the solution was heated to just over 100° C. overnight to evaporate to dryness. The catalyst product was a dark powder consisting of a monolayer equivalent of tin(IV) oxide on 10 micron diameter silica spheres, with a $\frac{1}{3}$ monolayer loading equivalent of platinum metal.

The preceding example called for 2 grams of tin for a monolayer equivalent of tin oxide on 10 grams of high surface area silica spheres having a B.E.T. area of 167 $m^2/g$. The amount of tin was calculated by knowing the area of a O-Sn-O surface molecule and extrapolating that area to 167 $m^2/g$ for 10 grams to obtain the number of moles of $SnO_2$, and hence the amount of tin required for that many moles. This same procedure can be used for any other metal oxide and a known B.E.T. area of the support. The example also indicated 3.5 grams of $Pt(NH_3)_4(OH)_2$ for $\frac{1}{3}$ monolayer equivalent of Pt on the surface. This was calculated by taking $\frac{1}{3}$ the number of moles of $SnO_2$ for the moles of Pt required, then converting that to the weight of $Pt(NH_3)_4(OH)_2$ to be added in the second step.

The above procedure can be used to calculate the amount of any metal oxide for a monolayer equivalent and a fractional monolayer of precious metal.

What is claimed is:

1. A method of coating a porous, high surface area, ceramic support material with a catalyst comprising tin(IV) oxide overlaid with a noble metal, which process comprises chemically forming in one step a thin tin(Iv) oxide coating form solution directly on the ceramic support material followed by chemically forming in on step a thin noble metal coating from solution directly on the tin(IV) oxide-coated ceramic support material, the tin(IV) oxide coating and the thin noble metal coating each having an amount of matter therein equivalent to about that contained in a monolayer, the ceramic support material being first immersed in deionized water, after which metastannic acid is provided therein, the metastannic acid having been generated by a process which leaves no residue to act as a poison for the catalyst, whence the metastannic acid is absorbed on the ceramic support material, whereupon the metastannic acid becomes tin(IV) oxide upon evaporation and drying.

2. The method of claim 1, wherein the metastannic acid is generated by dissolving tin metal in an acid, any excess of which acid and any unwanted products of the reaction thereof with tin metal being vaporizable or decomposable to volatile products upon heating, thereby leaving an uncontaminated thin layer of tin(IV) oxide on the ceramic support material.

3. The method of claim 2, wherein the acid is nitric acid.

4. The method of claim 3, wherein the metastannic acid absorbed on the support is converted to tin(IV) oxide by evaporation and drying to remove excess water and nitric acid.

5. The method of claim 3, wherein the amount of tin metal employed is calculated to result in a thin coating of tin(IV) oxide on the support material in an amount equivalent to that contained in a monolayer without appreciable blocking of the pores of the support material, whereby an efficient catalyst is produced.

6. The method of claim 1, wherein the noble metal is selected from the group consisting of platinum and palladium, and the noble metal coating is chemically formed from solution directly on the tin(Iv) oxide-coated ceramic support material by a process which leaves no residue to act as a poison for the catalyst.

7. The method of claim 6, wherein the tin(IV) oxide-coated support material is immersed in deionized water after which a platinum or palladium compound is added and is absorbed from solution onto the surface of the tin oxide, followed by reduction of the noble metal compound to noble metal by a soluble reducing agent, the reducing agent and all products of the reduction reaction except the metal, decomposing or vaporizing upon heating, whereby an uncontaminated metal coating is formed on the tin(IV) oxide-coated ceramic support material.

* * * * *